United States Patent [19]

Wang et al.

[11] 4,380,078
[45] * Apr. 12, 1983

[54] SEGMENTED HOLLOW CATHODE LASER WITH SPLIT ANODE

[75] Inventors: Shing C. Wang, Arcadia; Randolph W. Hamerdinger, Glendora, both of Calif.

[73] Assignee: Xerox Corporation, Stamford, Conn.

[*] Notice: The portion of the term of this patent subsequent to Mar. 10, 1998, has been disclaimed.

[21] Appl. No.: 277,314

[22] Filed: Jun. 25, 1981

Related U.S. Application Data

[63] Continuation-in-part of Ser. No. 948,077, Oct. 2, 1978, Pat. No. 4,287,484.

[51] Int. Cl.³ .................................................. H01S 3/08
[52] U.S. Cl. ........................................... 372/62; 372/87
[58] Field of Search .................... 331/94.5 G, 94.5 PE

[56] References Cited

U.S. PATENT DOCUMENTS

| | | | |
|---|---|---|---|
| 3,868,593 | 2/1975 | Fukuda et al. | 331/94.5 PE |
| 4,031,428 | 6/1977 | Tokudome et al. | 331/94.5 PE |
| 4,105,954 | 8/1978 | Wang et al. | 331/94.5 PE |
| 4,255,720 | 3/1981 | Wang et al. | 331/94.5 G |
| 4,287,484 | 9/1981 | Wang et al. | 331/94.5 G |

Primary Examiner—William L. Sikes
Assistant Examiner—Léon Scott, Jr.
Attorney, Agent, or Firm—Franklyn C. Weiss

[57] ABSTRACT

A gas laser for generating multiline emissions when appropriately energized. The laser includes an anode-cathode assembly (18, 16, 18) and, in a first embodiment, adjustable Brewster end sections, or in a second embodiment, integral mirror end sections (70, 72). The anode-cathode assembly comprises two center located short cylindrical anodes (16a, 16b) and two segmented cylindrical hollow cathodes (18) located symmetrically adjacent the split anode (16a, 16b). The anodes and cathodes are electrically insulated by a cylindrical metal ceramic seal (20). The outer surface of each cathode (18) is covered with quartz insulating sleeves (24) to prevent electrical discharge from the outer cathode surface and to encourage effective inner cathode discharge. The cathode (18) is thermally connected to the external environment through a structure (26) coupled to the cathode and the laser tube envelope (11) to improve heat dissipation, thereby allowing higher input power. A metal vapor reservoir (30) is attached to the anode section for metal vapor laser operation. The laser of the present invention can be made up of one or more anode-cathode assemblies depending on the laser medium and the selected output requirement.

10 Claims, 3 Drawing Figures

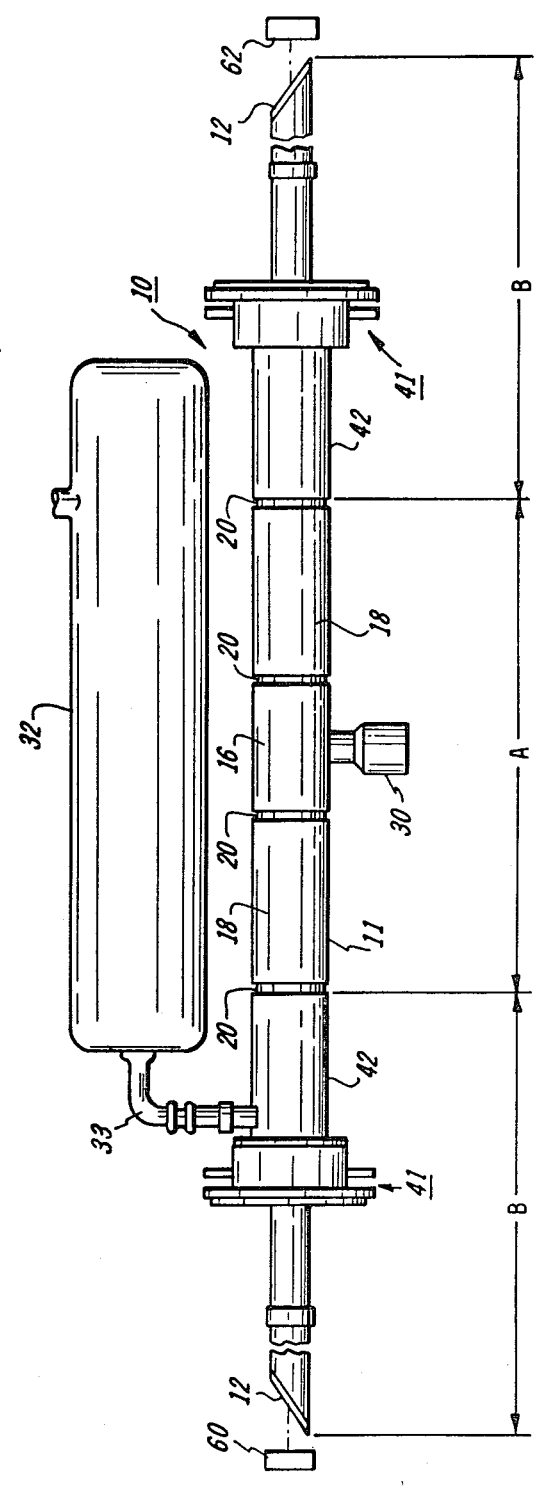

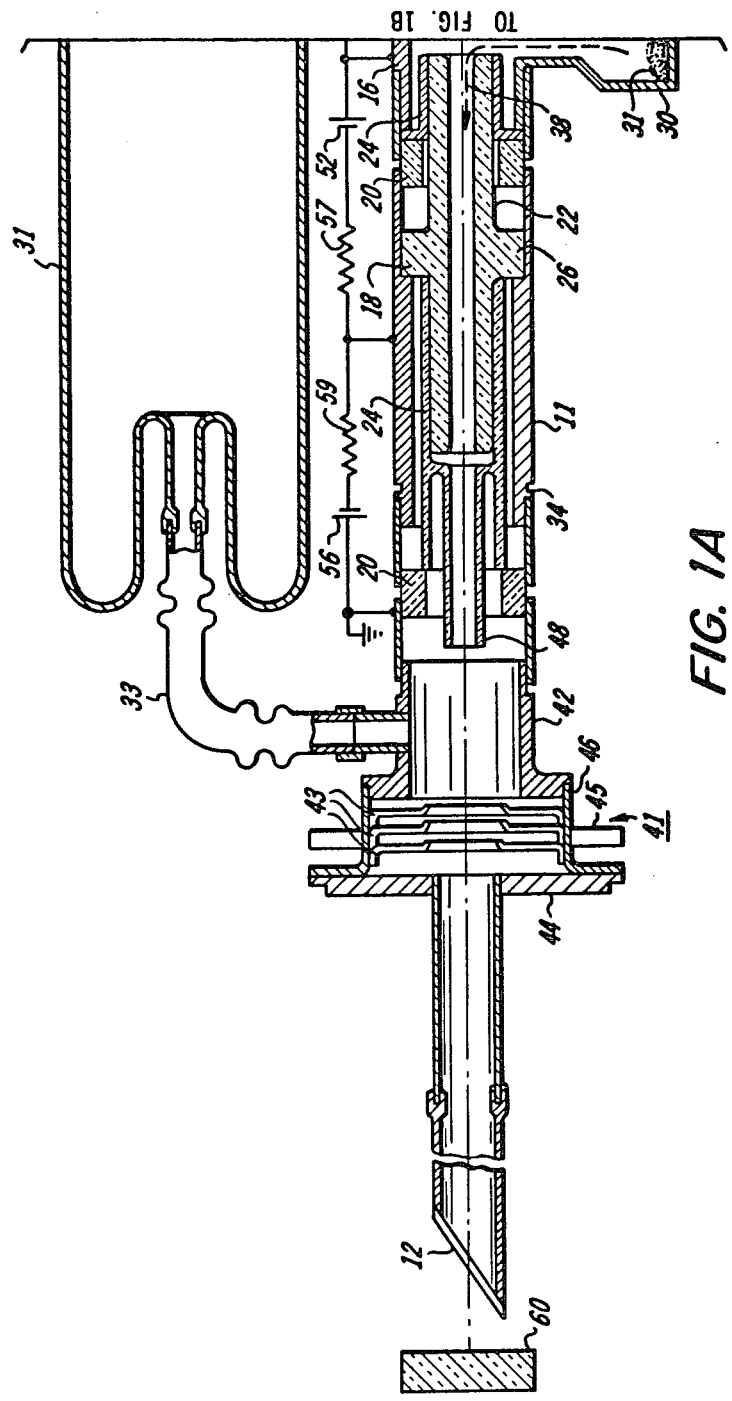

SEGMENTED HOLLOW CATHODE LASER WITH SPLIT ANODE

This application is a continuation-in-part of an earlier filed application entitled "Segmented Hollow Cathode Laser Device", filed Oct. 2, 1978, Ser. No. 948,077, by the same inventors herein, and assigned to the same assignee, now U.S. Pat. No. 4,287,484.

This invention relates to a gas laser of the kind which includes an elongated envelope containing a gaseous medium, hollow coaxial anode and cathode means for connection to a voltage supply to produce an electrical discharge in the gaseous medium, and reflector means at or near the ends of the envelope.

BACKGROUND OF THE INVENTION

The present state of laser technology has advanced substantially from that available in prior years. For example, a variety of laser devices, including gas lasers, dye lasers and solid state lasers are available for particular customer applications. At this time, a substantial portion of the commercially marketed lasers are of the gas variety. The gas lasers available are generally limited to a laser device which produces on a single wavelength (emission line) or a single color output. For example, helium-neon laser devices which are available commercially generate only the red wavelength (i.e., 6238 A) output. Although argon ion gas lasers are available, which are capable of simultaneously producing blue and green output light, the argon gas laser is considered to be too costly, inefficient and cumbersome as far as size is concerned to have extensive commercial applications.

The laser disclosed in U.S. Pat. No. 4,021,845 produces white light (light having multiple lines) which includes three of the primary colors; red, blue and green. The laser is very advantageous since an end user has the capability of selecting the desired wavelength(s) for a particular application from a plurality of available wavelengths, the laser being relatively inexpensive and of a physical size which makes it attractive for many commercial applications.

Although the laser described in the aforementioned patent has performed satisfactorily, a more compact and controllable type of laser which can be operated at higher input density would be desirable. Further, it would be desirable if the basic configuration of the laser could be easily expandable to allow the power level for a selected wavelength to be increased depending on the type of application required. In other words, what is desired is a multiline laser device which is capable of operating at high input power density which in turn allows the power level for a particular wavelength desired to be increased, has improved stability characteristics, is compact and is cost effective while providing the multiple line output.

The gas laser of the present invention is intended to provide these additional advantages, and is characterized in that the anode means comprises a split, centrally located, short cylindrical anode and two segmented hollow cathodes located symmetrically adjacent the split anode.

The hollow-cathode gas laser of the present invention provides many advantages over prior art multi-line lasers in that the gain, current density and power loading of each laser transition can be controlled and wherein, for multicolor operation, color balancing and control is also provided.

DESCRIPTION OF THE DRAWINGS

A gas laser in accordance with the invention will now be described, by way of example, with reference to the accompanying drawings, in which:

FIG. 1 is a side view of the laser of the present invention which utilizes Brewster windows;

FIGS. 1A and 1B together constitute a cross-sectional view of the laser shown in FIG. 1;

DETAILED DESCRIPTION OF THE INVENTION

Figure 1B:
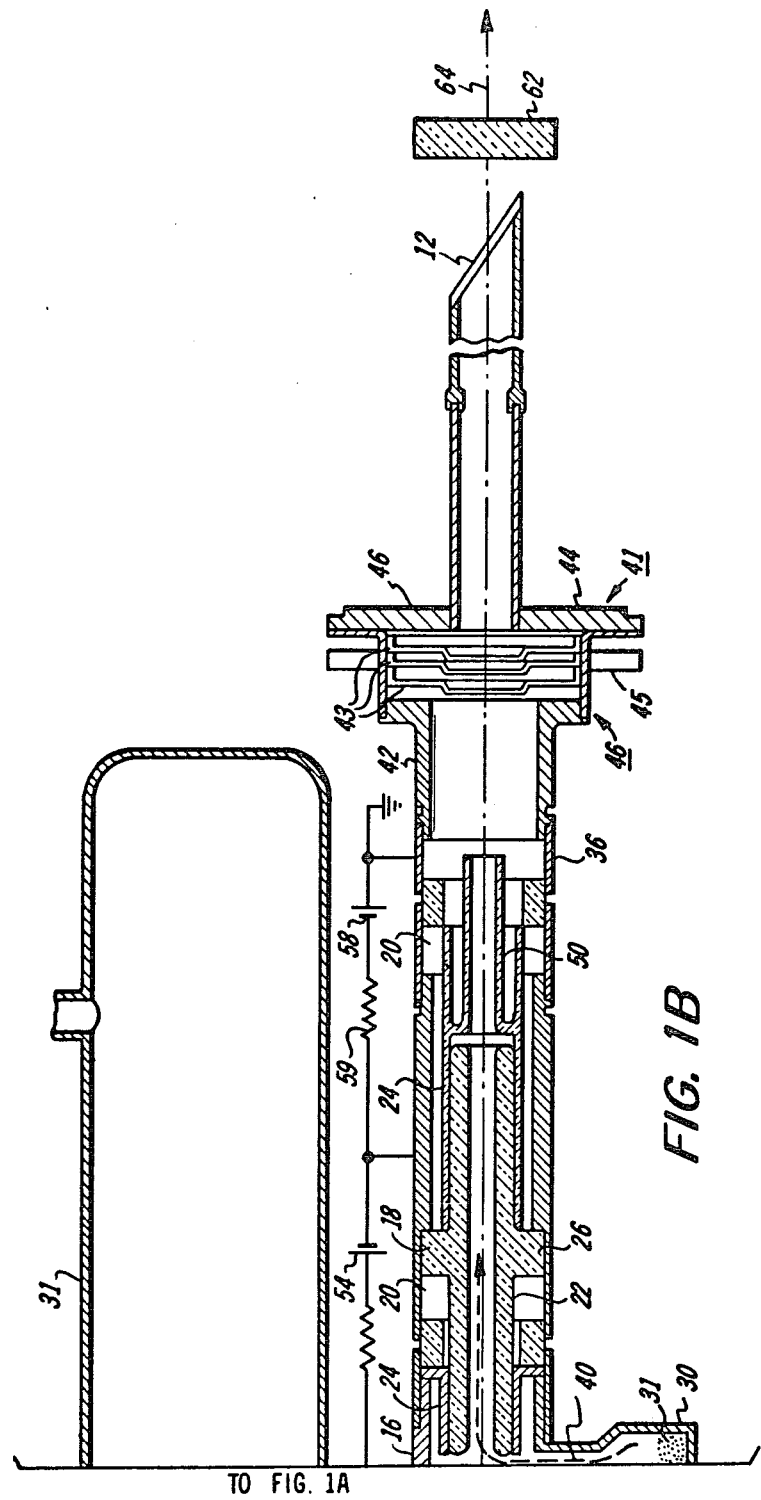

Referring to FIGS. 1, 1A and 1B, an embodiment of the laser tube device 10 of the present invention is illustrated, the embodiment utilizing Brewster windows 12. The laser device of the present invention, which includes outer envelope 11, may be thought of as comprising two major components, anode-cathode assembly A and Brewster window end sections B.

The anode-cathode assembly A comprises a center-located short cylindrical anode 16, and two segmented cylindrical hollow cathodes 18 located symmetrically on each side of the anode 16. The anode 16 and cathode 18 are electrically insulated by cylindrical metal-to-ceramic seals 20. A substantial portion of the outer surface 22 of each cathode 18 is partially covered with glass or ceramic insulating sleeves 24 to prevent electrical discharge in the outer cathode surface and promote effective inner cathode discharge. The cathodes, made preferably of molybdenum, are thermally connected to the external environment through structure 26, and the laser tube envelope 11 which is made of stainless steel or Kovar. Thus, the heat generated within the cathodes 18 due to the electrical discharge can be effectively conducted away to the environment which allows higher input power loading to the cathodes when higher laser excitation power is required for certain laser actions. For example, argon as the active laser medium requires more power than cadmium for laser operation. Further, the feature allows the laser device to be more compact than would otherwise be possible. For laser operation utilizing metal vapors, a reservoir 30 containing the particular metal 31 to be utilized is provided and comprises part of the anode-cathode assembly A. The reservoir 30 is thermally decoupled from the anode-cathode assembly A through a heat-choke arrangement so that the metal vapor pressure can be separately and independently controlled by external heater means (not shown). Although reservoir 30 is shown connected within anode 16, the reservoir could be connected directly into the bore of cathodes 18 if desired. In the embodiments illustrated in the figures, an auxiliary gas, such as helium, is stored in reservoir 32 and connected into the main tube envelope 11 via tubing 33. Although gases other than helium may be utilized, helium will be discussed hereinafter since the laser of the present invention is particularly useful as helium-cadmium or other helium-metal vapor, helium-rare gas, helium-metal halides and dimer lasers. In the case when cadmium metal is to be utilized as the active lasing medium, a predetermined charge of cadmium metal 31 is placed in reservoir 30 and the reservoir is then heated. A controlled amount of metal vapor is released into the anode section, and is transported from anode 16 through each cathode section by natural diffusion and D.C. cataphoresis action. The path of the vapor flow is illustrated by reference numerals 38 and 40. Thus, near uniform vapor density can be assured within and throughout the cathode sections 18. The adjustable Brewster window end sections B are attached to each end of the anode-cathode assembly A. Each end section comprises a Brewster window 12, an auxiliary anode portion 42 and a metal vapor condensor portion 41. The auxiliary anode portion 42 provides an auxiliary discharge into cathode 18 to assure discharge uniformity within cathode 18 and, in conjunction with finite positive column discharge section 48, metal vapor can be prevented from reaching the end window 12 (or mirror 76 in the FIG. 2 embodiment) by DC cataphoretic confinement. Metal vapor condensor portion 41 comprises a flexible flange 44, a rigid flange 45, and a fixture 46 acting as a condensing baffle to protect against the diffusion of metal vapor, such as cadmium, to windows 12. The fixture 46 comprises a plurality of apertured Kovar discs 43. Adjustment of fixture 46 by screws (not shown) allows adjustment of the Brewster angle of window 12 which can compensate for any offset from the correct angle due to the final assembly process.

Auxiliary anode 42 contributes an auxiliary discharge to the main discharge in providing a uniform discharge throughout the cathode section and also inhibits movement of the cadmium vapor towards Brewster windows 12 by the cataphoretic effect.

Sections 48 and 50, made of glass or quartz, are also provided to guide the electrical discharge into the inner bore of the cathode 18 along paths 38 and 40.

As is well known in the laser art, a relationship exists between the pressure of the carrier gas medium and the internal diameter of the laser bore (discharge active region) which determines the optimization of a particular laser transition. In particular, the relationship P.d, wherein P is the pressure, in Torrs, of the carrier gas and d is the internal diameter, in centimeters, of the laser bore, determines whether a particular transition, and in particular, the output power of the light produced by such transition, is optimized.

For example, in the laser of the present invention which is capable of producing multicolor light the color red (6360 Å) is optimized for a low P.d product, typically 2. The color green (5378 Å) is optimized for a high P.d product, typically 8, and the color blue (4416 Å) is optimized for an intermediate P.d product, typically 3.

Since the pressure of the carrier gas, such as helium in the preferred embodiments, is maintained at an essentially constant value, the aforementioned relationship indicates that the diameter parameter is to be varied in order to provide the optimized P.d product for a particular light output. Although a laser device with one cathode-anode assembly can generate three colors at a uniform bore diameter and fixed helium pressure as set forth in the aforementioned copending application, for better control of the individual transitions (colors) at least three cathode sections with different inner diameters are preferred with each cathode optimized for each color. For even finer control of the color output, two or more cathode sections of the same internal diameter and length may be incorporated in the design of the laser for each color. The actual internal diameter and length of each cathode selected is dependent on the optimal P.d relation and the power level requirement for each color. The length of each section can also be varied to adjust the gain of the laser transition associated with that section. The total laser power output also can be controlled by adjustment of the current density through each hollow cathode section. if the laser device is arranged to extract a light output which simultaneously contains a plurality of colors, the use of the optimized cathode sections provides for color balancing and control.

The laser device 10 can comprise more than one anode-cathode assembly depending upon the particular output power requirement. It should be noted that other active lasing media could be utilized, such as metals (such as zinc and selenium), metal halides (such as copper chloride and mercury chloride, rare gases (such as helium-xenon and helium-krypton) and selenium iodide (dimer type lasers). The preferred assembly (in the embodiment shown in FIGS. 1, 1A and 1B) has an envelope window to window spacing of about 42 cm, 2.0 cm outside diameter, 1.7 cm inside diameter, a molybdenum hollow cathode 18 of approximately 5 cm length, 0.3 cm inside diameter, and 0.9 cm outside diameter, and a stainless steel anode 16 of 1.6 cm length, 1.5 cm inside diameter and 2.0 cm outside diameter with reservoir 30 filled with cadmium. The d.c. electrical discharge between anode 16 and cathodes 18 is maintained at a d.c. voltage level in the range of from about 250 to about 350 volts by voltage sources 52 and 54 via ballast resistors 57 with a corresponding variable current ranging from about 20–200 milliamps being maintained. Voltage sources 56 and 58 apply a potential between the auxiliary anode 42 via appropriate ballast resistors 59. The discharge within cathodes 18 is operated in the mode of negative glow discharge. The active length of the device is about 10 cm and CW (continuous wave) laser action is obtained in the He-Ne red (6328 Å) transition at 2–3 Torr and a He-Ne (helium-neon) ratio=7:1, and all visible color (red, 6360 Å, 6350 Å; green, 5337 Å, 5378 Å; and blue, 4416 Å) transitions in the He-Cd laser are obtained at about 10 Torr of He and a Cd temperature of about 310° C.

By appropriate choice of reflectors 60 and 62 which form the optical resonator, the desired output wavelength(s) can be produced. Reflectors 60 and 62 may be multiple layer dielectric coated reflectors, reflector 62 being typically adapted to be partially transmissive to enable a portion 64 of the coherent radiation to be extracted from the laser device 10. Reflector 62 may be a broadband output reflector if output 64 is multi-color.

An advantage of the present invention is provided by the segmentation of the hollow cathode 18 into more than two segments, with the cathode segment portions preferably being of a variable diameter and of a varying length. Segmentation allows a substantially uniform and controllable discharge to occur inside the cathode segments which therefore provides a substantially uniform excitation and vapor density inside the cathodes to assure effective pumping of the laser transition and to create a more efficient laser light output. Further, outer cathode structure 26 provides a more efficient way of dissipating the power generated in the cathodes thereby allowing higher power output density loading. The present invention also allows the design of laser power output level for each selected laser medium by adjusting the number of assemblies, thus adjusting the active length and gain of the laser, the laser overall gain being proportional to the active length (total length of discharge within cathodes) of the laser. The inner diameter and length of each cathode can be varied to match the laser cavity mode such that optimal laser output power extraction can be provided for each color (total color output thereby being optimized) and also provides for color balancing and control. For example, for a helium-cadmium laser operating at approximately 10 Torr of helium, a voltage of 280 volts, a current in each cathode section of approximately 140 milliamps (30 ma/cm$^2$) and a cadmium temperature of 310° C., two cathodes (single cathode-anode assembly including a single anode) of an inner diameter of 0.3 cm and a length of 5 cm will provide a blue and green line at 4–5 milliwatts of power and the red line at 0.5 milliwatts of power; for four cathodes (dual cathode-anode assembly having three anodes) having the same dimensions as the corresponding two cathode arrangement, the blue and green lines will have a power of 15 milliwatts associated therewith and a red line having 2 milliwatts of power associated therewith.

The laser configuration for additional cathode-anode assemblies is similar to the assembly shown in FIGS. 1, 1A and 1B, the additional assemblies being arranged coaxially between the end sections along the optical axis of the laser 10.

Figure 2:
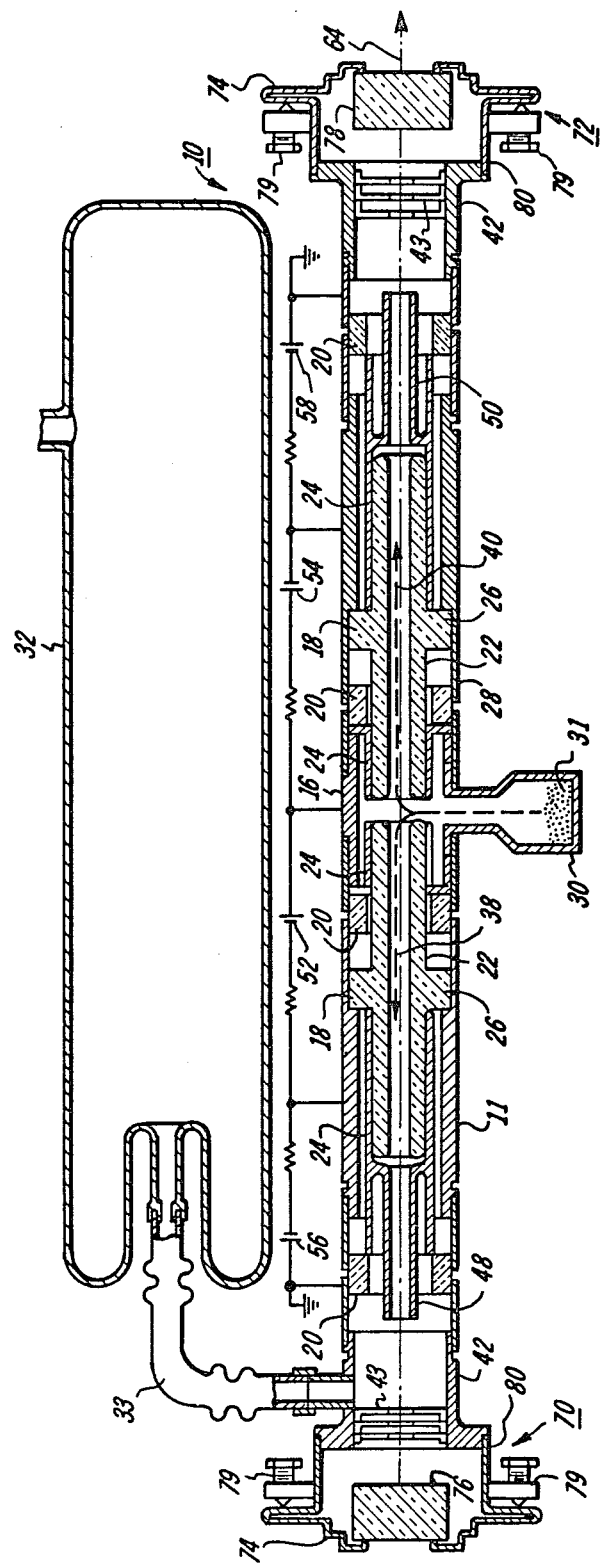
FIG. 2 is a cross-sectional view of the laser of the present invention utilizing integral mirrors.

The FIG. 2 embodiment is substantially identical to the embodiment shown in FIGS. 1, 1A and 1B with the exception that the Brewster window end section B and the optical reflectors 60 and 62 are replaced with integral mirror subassemblies 70 and 72. Each subassembly comprises an apertured flange member 74, mirrors 76 and 78 bonded to the flange members 74, a metal flange member 80, sealed to the end of the tube envelope 11, which is welded to flange member 74 and mirror adjustment screws 79. Further, in lieu of the complete portion 41, only the metal vapor condensing baffles 43 are located within the envelope 11 adjacent the auxiliary anode portion 42. Mirror 78 is selected to allow laser light 64 to be extracted from the laser 10.

The laser mirrors 76 and 78 are coated for particular wavelengths of the laser transition and form an integral part of the whole laser device 10.

The whole laser device 10 is made of all metal structure, preferably stainless steel, except for the molybdenum hollow cathode sections and the high temperature metal-to-ceramic seal insulation utilized. The gas ballast reservoir 32 may also be made of stainless steel material. Typically, the overall length of the laser device 10 between mirrors 76 and 78 is about 25 cm which is substantially less than the typical overall length of the embodiment shown in FIGS. 1, 1A and 1B. The laser device is a compact and rugged structure and requires no external optical resonator structure and no Brewster windows. It also minimizes the power fluctuation due to ambient air turbulent flow within the laser resonator. The integral mirror subassemblies are described in detail in U.S. Pat. No. 4,149,779, assigned to the assignee of the present invention.

It should be noted that both embodiments described hereinabove can provide an intense blue or green output light having many potential applications.

Although the passive gas ballast reservoir 32 has worked successfully, the active helium pressure regulator described in copending application Ser. No. 885,839, filed Mar. 13, 1978, and assigned to the assignee of the present invention may also be utilized.

A detailed description of typical gas laser operation is not set forth herein for the purposes of brevity. The operation, for example, of helium-neon lasers is well known in the art as is the operation of metal vapor lasers, such as helium-cadmium lasers. The aforementioned U.S. Pat. No. 4,021,845 describes the operation of a helium-cadmium laser wherein three color laser light is created.

Figure 3A:
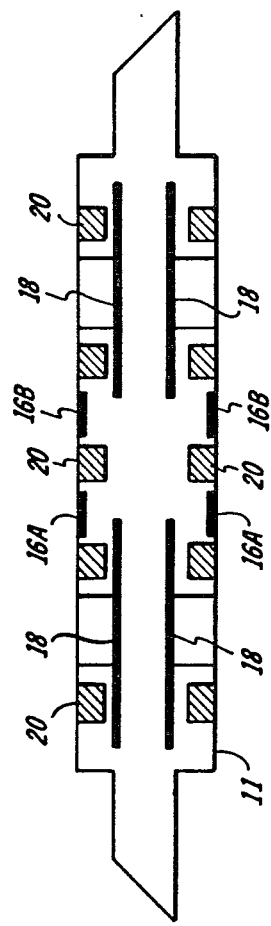
FIGS. 3A and 3B are simplified representations of examples of how the split anode laser of the present invention is configured to optimize the particular laser mode generated in the laser cavity.
Figure 3B:
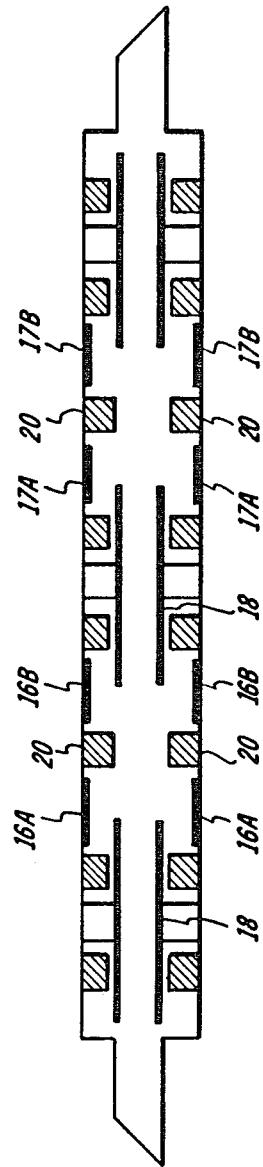

FIGS. 3A and 3B disclose the inventive features of this application. In the embodiments shown and described above, the tube anode was designed to be common to two segmented cathodes. In these embodiments, the current in each cathode was fed by the same anode with the adjustment of current in each segment being accomplished by the ballast resistor 57, 59 in each circuit loop. However, the current balancing between each segment may be difficult to adjust by the ballast resistor. Also, the maintenance of the balance current may be difficult due to the common anode with the segmented cathodes. The electrical connection for the power supply and control electronics may be inconvenient, especially when a multiple segment laser tube is concerned.

FIG. 3A discloses a split anode 16a, 16b wherein the anode to each cathode segment is physically split in two sections and electrically insulated by the ceramic insulator 20 between them. In this configuration, the electrical current in each cathode segment 18 is totally independent of each other and can be controlled and balanced easily. Further, the electrical insulation between the split anodes allows each anode-cathode module to be isolated or floated electrically. This facilitates the electrical connections of the power supply circuit and contrl electronics for the laser tube. A unit modular hollow cathode of such design has a significant impact on the controllability, modularability and manufacturability of a gas laser.

FIG. 3b shows the split anode hollow cathode laser design for a multiple module embodiment. Thus, split anodes 16a, 16b and 17a, 17b can be seen between hollow cathodes 18.

FIGS. 3a and 3b are much simplified, and improved, representations of the lasers shown and described in conjunction with FIGS. 1 and 2. The embodiments shown in FIGS. 3a and 3b should be understood to include the features of the laser tubes described in said FIGS. 1 and 2.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A gas laser including an elongated envelope (11) containing a gaseous medium, hollow coaxial anode and cathode means (16,18) for connection to a voltage supply to produce an electrical discharge in the gaseous medium, and reflector means (60, 62) at or near the ends of the envelope, characterized in that the cathode means (18) comprises at least two separate cathodes and the anode means comprises at least two short cylindrical anodes centrally located between said separate cathodes.

2. A gas laser including an elongated envelope (11) containing a gaseous medium, hollow coaxial anode and cathode means (16, 18) for connection to a voltage supply to produce an electrical discharge in the gaseous medium, said cathode means comprising at least two separate cathodes located symmetrically adjacent the ends of said anode means, characterized in that said anode means comprising a split anode centrally located between said cathodes.

3. A gas laser according to claim 1 or claim 2 wherein the anodes and the cathodes are of metal, with the anodes electrically insulated from each other and the cathodes by ceramic members, the ceramic members being secured to the anodes and the cathodes by metal-to-ceramic seals.

4. A gas laser according to claim 2 wherein the gaseous medium includes a metal vapor.

5. A gas laser according to claim 4 wherein the gaseous medium comprises cadmium vapor and helium.

6. A gas laser according to claim 5 wherein the ends of the envelope are sealed by Brewster windows and further including reflectors coaxially aligned and adjacent each of said Brewster windows.

7. A gas laser according to claim 5 wherein the ends of the envelope are sealed by reflectors, one of the reflectors being reflective of the output beam of the laser and the other of the reflectors partially transmitting the output beam.

8. A gas laser according to claim 7 including means associated with the cathodes for coupling the cathodes to the envelope whereby the heat generated therein is dissipated to the external environment.

9. A gas laser according to claim 8 including auxiliary anodes forming another portion of the envelope and positioned adjacent the ends of the envelope.

10. A gas laser according to claim 9, the laser being configured to comprise more than two cathodes and more than a single split anode, the total number of cathodes and split anodes being optically aligned to increase the overall gain of the laser, the inner diameters of the cathodes being selected to match the laser cavity mode such that optimal laser output power extraction for each color is produced.

* * * * *